United States Patent
Ballu

(10) Patent No.: US 9,339,023 B2
(45) Date of Patent: May 17, 2016

(54) SPRAYING APPARATUS FOR AGRICULTURAL MACHINE WITH CARTOGRAPHIC PILOTING

(75) Inventor: Patrick Jean Marie Ballu, Reims (FR)

(73) Assignee: EXEL INDUSTRIES (FR)

( * ) Notice: Subject to any disclaimer, the term of this patent is extended or adjusted under 35 U.S.C. 154(b) by 29 days.

(21) Appl. No.: 13/822,066

(22) PCT Filed: Aug. 23, 2011

(86) PCT No.: PCT/FR2011/051948
§ 371 (c)(1),
(2), (4) Date: Mar. 11, 2013

(87) PCT Pub. No.: WO2012/032245
PCT Pub. Date: Mar. 15, 2012

(65) Prior Publication Data
US 2013/0292487 A1    Nov. 7, 2013

(30) Foreign Application Priority Data

Sep. 10, 2010    (FR) ...................................... 10 57209

(51) Int. Cl.
*B05B 1/20*    (2006.01)
*A01M 7/00*    (2006.01)

(52) U.S. Cl.
CPC ........... *A01M 7/0089* (2013.01); *A01M 7/0042* (2013.01); *A01M 7/0057* (2013.01)

(58) Field of Classification Search
CPC ..... A01G 25/092; A01G 25/16; A01G 25/09; A01G 25/165; A01M 7/0053; A01M 7/0071; A01M 7/0014; A01M 7/0075; A01M 7/0057; A01M 7/0082; A01M 7/0089; A01M 21/00; A01M 7/00; A01M 7/006; A01C 15/005; A01C 21/005; A01C 23/00
See application file for complete search history.

(56) References Cited

U.S. PATENT DOCUMENTS

| 4,823,268 | A  | * | 4/1989  | Giles et al. ...................... 701/50 |
| 5,704,546 | A  | * | 1/1998  | Henderson et al. ................ 239/1 |
| 6,126,088 | A  | * | 10/2000 | Wilger et al. .................. 239/170 |
| 6,230,091 | B1 | * | 5/2001  | McQuinn ........................ 701/50 |
| 6,694,260 | B1 |   | 2/2004  | Rekow |
| 7,502,665 | B2 | * | 3/2009  | Giles et al. .................... 700/241 |
| 2004/0136139 | A1 | * | 7/2004 | Kummel ....................... 361/226 |

(Continued)

FOREIGN PATENT DOCUMENTS

| DE | 19642439 C1 | 11/1997 |
| DE | 19821283 A1 | 11/1999 |

(Continued)

OTHER PUBLICATIONS

International Search Report issued Nov. 3, 2011; re: PCT/FR2011/051948; pp. 3; citing: GB 2 347 368 A, DE 196 42 439 C1, US 6 694 260 B1, DE 197 25 547 A1, US 2009/132100 A1 and DE 198 21 283 A1.

*Primary Examiner* — Len Tran
*Assistant Examiner* — Adam J Rogers
(74) *Attorney, Agent, or Firm* — Cantor Colburn LLP

(57) ABSTRACT

This control system for an agricultural spraying machine (1), of which the boom (5) is equipped with a plurality of multi-nozzle units (9), is characterized in that it comprises means (15*a* to 15, 17*a* to 17*e*, 23) for piloting each multi-nozzle unit (9) according to data representative of the cartography of the plants to be treated.

9 Claims, 3 Drawing Sheets

(56) References Cited

U.S. PATENT DOCUMENTS

2008/0114498 A1* 5/2008 Giles et al. .................... 700/283
2009/0132100 A1 5/2009 Shibata

FOREIGN PATENT DOCUMENTS

DE 19725547 A1 6/2001
GB 2347368 A 9/2000

* cited by examiner

SPRAYING APPARATUS FOR AGRICULTURAL MACHINE WITH CARTOGRAPHIC PILOTING

TECHNICAL FIELD

The invention relates to a control system for an agricultural spraying machine.

RELATED ART

An agricultural apparatus for agricultural spraying traditionally includes a spray bar bearing a plurality of spray nozzles, supplied with phytosanitary liquid located in a tank by a circuit incorporating a high-pressure pump.

To meet the specificities of the plants to be treated, multi-nozzle units have been developed to replace the traditional single nozzles.

Each multi-nozzle unit comprises a body bearing several nozzles (typically 2, 3 or 4 nozzles) and incorporating valve means (electric or compressed air), making it possible to operate these nozzles separately or in combination.

The use of such multi-nozzle units makes it possible to spray jets on the plants to be treated, the shapes, drop sizes and flow rate of those jets being perfectly suited to each type of plant to be treated.

BRIEF SUMMARY

The present invention in particular aims to optimize the operation of an agricultural spraying apparatus whereof the bar is equipped with multi-nozzle units.

This aim of the invention is achieved with a control system for an agricultural spraying machine whereof the bar is equipped with a plurality of multi-nozzle units, remarkable in that it comprises means for piloting each multi-nozzle unit according to data representing the cartography of the plants to be treated.

"Cartography" refers to the distribution of the plants (including the detection of their presence or absence, and the detection of their condition) not only in the movement plane of the machine, but also along the vertical (i.e., presence or absence of slope).

Owing to the features of the control system according to the invention, it is possible to adapt the types of jets and their flow rates very subtly to the different categories of parcels simultaneously swept by the bar: parcels with or without plants, with plants of different natures, with plants planted more or less densely, with plants having different degrees of ripeness, with different slopes, etc.

In other words, the present invention makes it possible to completely differentiate the multi-nozzle units relative to one another, and thus to operate them in a customized manner, individually or in subgroups, to produce spraying perfectly adapted to the nature and topological configuration of the plants.

According to other optional features of the system according to the invention:

- this system comprises cartography means for the plants to be treated, control units for said multi-nozzle units, and a programmable electronic box, capable of receiving and processing information provided by said cartography means, and consequently sending control signals to each multi-nozzle unit;
- said cartography means comprise geographical positioning means;
- the geographical positioning means comprise means of the GPS type;
- said cartography means comprise means for detecting the presence or absence of plants to be treated and/or their morphology: this allows a real-time adaptation of the operation of the multi-nozzle units to the density, size or color of the plants to be treated;
- said detection means are chosen from the group comprising traditional cameras and infrared cameras; it should be noted that any other type of image sensor may be suitable;
- said cartographic means comprise means suitable for measuring the slope of the bar of said agricultural machine: these slope measuring means make it possible to correct the pressure differential caused by that slope in the ducts of the spraying system, by acting on the respective flow rates of the multi-nozzle assemblies situated at the opposite ends of the bar of the agricultural machine;
- said slope measuring means are chosen from the group comprising inclinometers, means for detecting the distance of the bar from the ground or its vegetation, and means for measuring the pressure difference of the phytosanitary liquid in ducts situated at two opposite ends of the bar of said agricultural machine;
- said electronic box and said control units are connected to each other by a system selected from the group comprising wired connections of the CAN bus type, and wireless connections.

The present invention also relates to an agricultural spraying machine equipped with a system according to the preceding.

BRIEF DESCRIPTION OF THE DRAWINGS

Other features and advantages of the present invention will appear in light of the following description, and upon examining the appended figures, in which.

DETAILED DESCRIPTION

In all of these figures, identical or similar references designate identical or similar members or sets of members.

Figure 1:
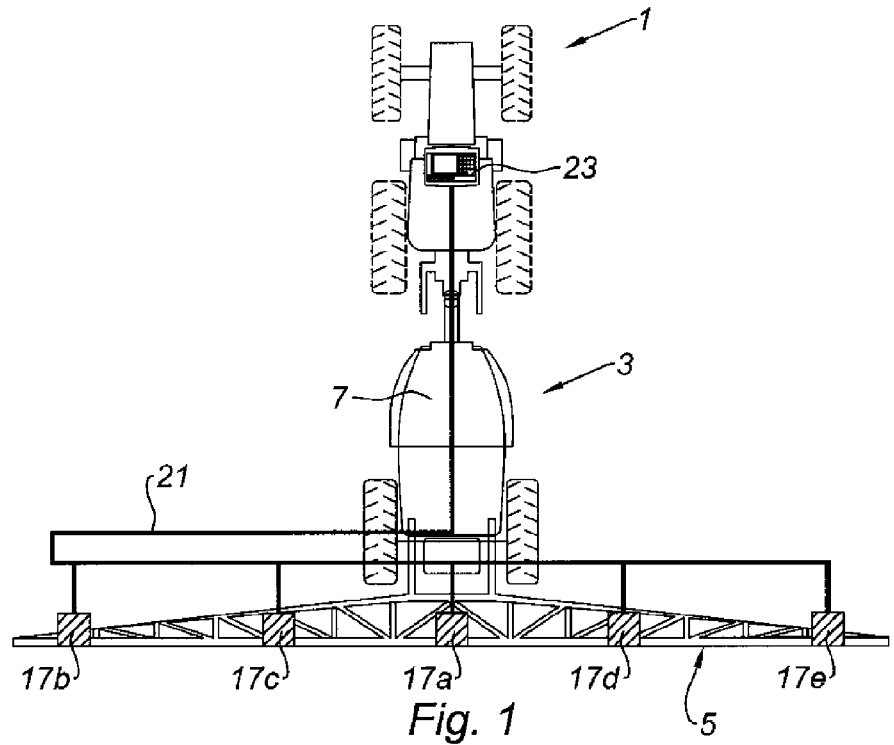
FIG. 1 shows an agricultural spraying machine equipped with a system according to the invention, FIG. 2 diagrammatically shows the control system according to the invention equipping the agricultural machine of FIG. 1.

Reference will now be made to FIG. 1, which shows a tractor 1 towing a sprayer 3 bearing a spray bar 5, which typically can measure several tens of meters long.

As is known in itself, such a sprayer 3 includes a phytosanitary liquid tank 7, which supplies a plurality of nozzles distributed over the entire length of the ramp 5, using at least one high-pressure pump (not shown).

Figure 3:
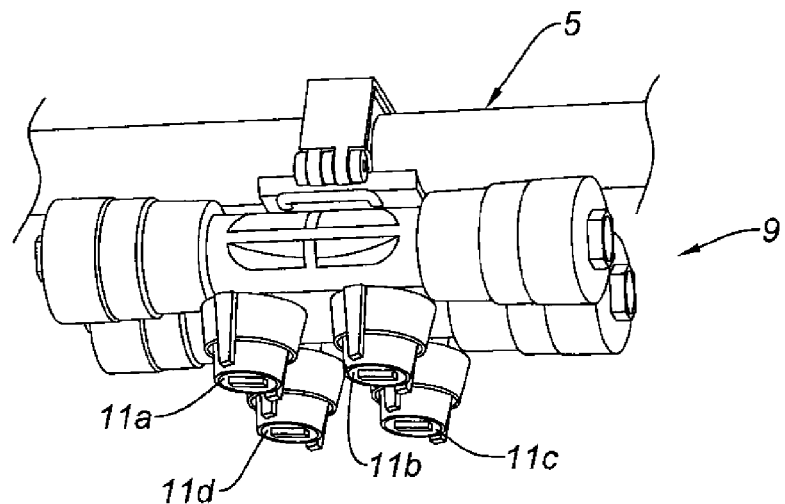
FIG. 3 shows a multi-nozzle unit suitable for operating with a control system according to the invention.

More specifically, in the context of the present invention, and as shown in FIG. 3, the nozzles are in fact distributed in bundles within multi-nozzle assemblies 9.

More specifically, as shown in said FIG. 3, a multi-nozzle unit with four nozzles 11a, 11b, 11c, 11d is shown non-limitingly.

This multi-nozzle unit 9 is capable of spraying phytosanitary liquid through each of the nozzles making it up, or through a selected combination of those nozzles.

Figure 2:
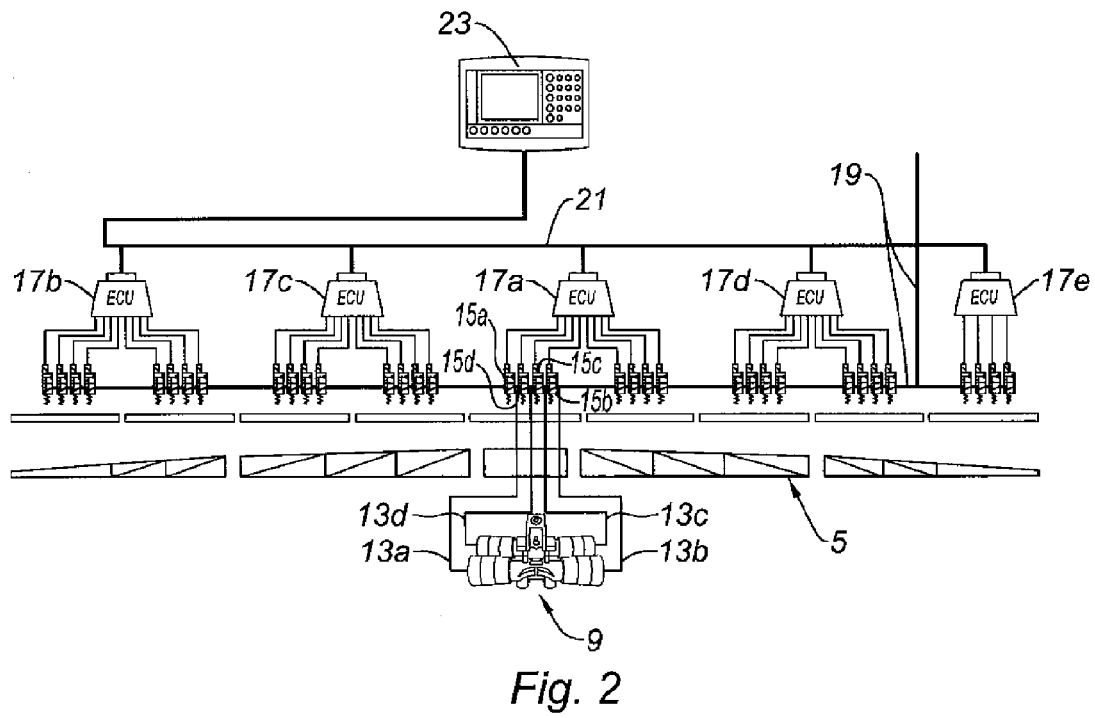

To that end, as shown in FIG. 2, the ducts 13a, 13b, 13c, 13d, capable of conveying the phytosanitary liquid, respectively end up at the nozzles 11a, 11b, 11c, 11d.

Respective solenoid valves 15a, 15b, 15c, 15d, piloted by an associated control unit 17a, make it possible to have the phytosanitary liquid selectively arrive in one of the nozzles 13a to 13d, or in a combination of those nozzles.

Preferably, as shown in FIG. 2, a compressed air line 19 makes it possible to act on the valves associated with each nozzle, to open them or close them.

As shown in FIG. 2, there are in fact a plurality of control units 17a, 17b, 17c, 17d, 17e, each associated with one or more multi-nozzle units, so as to control each of those units.

All of these control units 17 are connected to each other by an information transmission line 21, which is preferably of the BUS or CAN Bus type, so as to limit the number of electrical cables.

The line 21 communicates with a control box 23, on which the operator of the agricultural machine can enter operating instructions.

It must be noted that the nozzles 11a, 11b, 11c, 11d of each multi-nozzle unit 9 have different spraying characteristics.

As an example, the differences may pertain to the flow rate of each of those nozzles, or the form of the jet, or the size of the drops of the sprayed phytosanitary product.

Reference will now be made FIG. 4, which shows the agricultural machine of FIG. 1, traveling over a field cropping area having several sub-zones Z1, Z2, Z3 that are planted differently.

The difference in plantings may for example relate to the presence or absence of plants, differences in plant density, or even differences in the nature of plants.

The system according to the invention indeed makes it possible to take these differences into account upon passage of the agricultural machine 1.

More specifically, the nozzles 11a to 11d of each multi-nozzle unit 9 are piloted so as to choose the nozzle or combination of nozzles of that unit capable of creating the spraying jet(s) corresponding exactly to the morphology and the nature of the plants to be treated.

Figure 4:
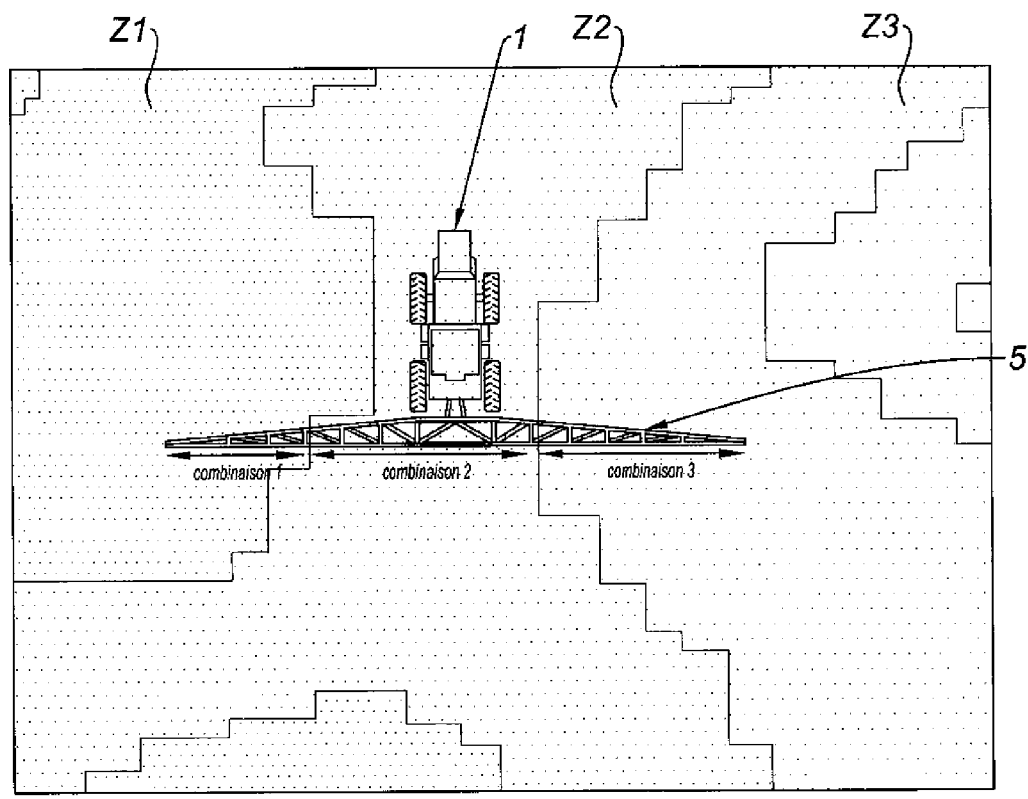
FIG. 4 shows a top view of the agricultural machine of FIG. 1 traveling over a field planted with plants of different natures and/or having different conditions (including the presence or absence of plants)

For example, in the case corresponding to FIG. 4, it is possible to produce a "combination 1" of nozzles 11 of the units 9 situated on the left part of the bar 5, which makes it possible to treat densely planted plants.

On the middle part of the spray bar 5, a "combination 2" of nozzles 11 of the units 9 is produced that makes it possible to treat plants having a particularly large size, and on the right part of the spray bar 5, a "combination 3" of nozzles 11 of the nozzle units 9 is produced that makes it possible to treat stunted plants, requiring a greater dose of phytosanitary product.

Of course, it will be understood that performing adjusting the operation of the nozzles 11 of the nozzle units 9 manually would be particularly tedious, and in practice doubtless unfeasible.

To that end, the present invention provides for interfacing the control box 23 with a geographical positioning system, making it possible to locate the agricultural machine 1 at all times relative to the field to be treated, that geographical positioning system in turn communicating with a database providing information on the cartography of the plants to be treated.

In this way, the system according to the invention makes it possible to control the nozzle units 9 completely automatically, depending on the position of the agricultural machine 1 on the field to be treated.

Alternatively, it is possible to consider that the agricultural machine 1 is provided with means for detecting characteristics of the plants to be treated (color, density, size, etc.) on the fly, thereby making it possible to adjust the choice of the nozzles 11 of each nozzle unit 9 directly.

These detection means can comprise image acquisition means, such as traditional or infrared cameras.

Regarding the particular case of sloped terrains, it must be recalled here that a spray bar may have a length of up to 48 m, which creates quite significant pressure differences in the phytosanitary liquid sent by the primary pump, and even more significant inasmuch as the phytosanitary liquid is charged with phytosanitary products, or has a high density: this pressure difference is in fact expressed by the formula:

$$\Delta P = \rho \times G \times \Delta Z,$$

P being the pressure, p the density of the liquid, G the earth's acceleration and Z the altitude.

By applying this formula, on a 10% slope, which is not rare, a bar 40 meters wide has a height difference of 4 meters between its two ends, the height difference creating a pressure difference of 0.4 bars in water, and 0.52 bars in liquid fertilizer.

If the slope reaches 15% with a bar 48 meters long spraying liquid fertilizer, the pressure difference reaches 1.25 bars.

This very significant pressure difference results in flow rate differences in the nozzles located at the opposite ends of the bar, causing important dosing differences of phytosanitary product on the plants to be treated.

To offset these dosage differences, in the context of the present invention, the slope of the terrain on which the agricultural machine 1 is traveling is taken into account to choose the nozzles or combination of nozzles 11 of the nozzle unit 9 making it possible to make the appropriate flow rate corrections.

Figure 5:
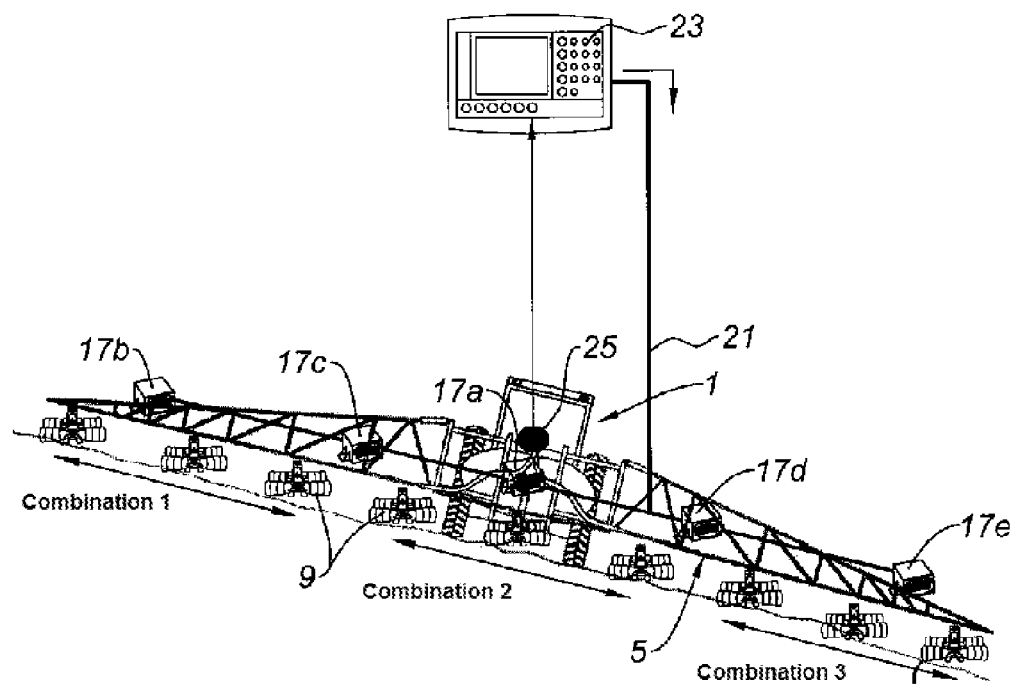
FIG. 5 shows a rear view of the agricultural machine of FIG. 1 when it moves on a sloped terrain.

The slope can be measured using an inclinometer 25 for example located in the middle area of the bar 5, as shown in FIG. 5, the information measured by that inclinometer being sent to the control box 23.

The control box 23 then sends the control units 17a to 17e information making it possible to choose the appropriate nozzles or combination of nozzles 11: for example, three different combinations respectively designated "combination 1," "combination 2" and "combination 3" in FIG. 5.

It must of course be specified here that the multi-nozzle units 9 can be piloted independently and individually, or grouped together, so as for example to obtain several bar sections each having several nozzle units 9 creating exactly the same combination of spray jets.

Figure 6:
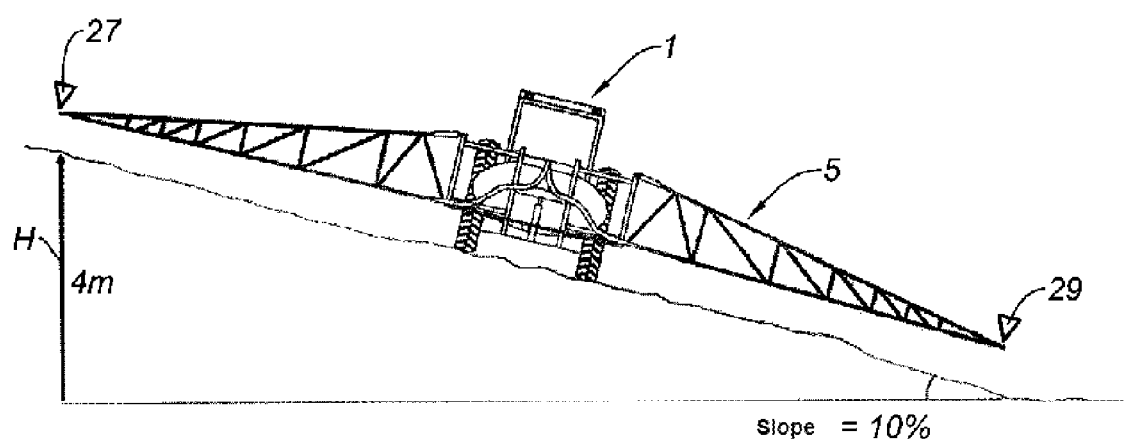
FIG. 6 is a view similar to that of FIG. 5, in which other means for detecting slopes are shown.

Another possibility to account for the slope of the terrain on which the agricultural machine 1 is traveling comprises measuring the pressure at the two ends 27 and 29 of the spray bar 5, as shown in FIG. 6, and deducing the corrections to be made on each of the multi-nozzle units 9 from the difference of those pressures, caused by the difference in height H between the two ends of the bar.

Another solution to account for the slope would be to use a three-dimensional cartography base, in which not only the planar distribution of plants to be treated would be filled in, but also the slope of the terrain on which those plants are located, that database being interfaced with the control box 23, as was described above.

As can be understood in light of the preceding, the control system for the multi-nozzle units 9 according to the invention is extremely high-performing, in that it allows a real-time adaptation, without any operator intervention, of the nature of the jets or combination of jets of each of said units 9 to the characteristics of the plants swept by the spray bar 5.

As previously indicated, this particular combination of jets specific to each unit 9 can be done individually and independently for each of said multi-nozzle units, but it is of course also possible to operate the multi-nozzle units 9 in groups, all of the units 9 in a same group then having the same spraying characteristics.

It will be noted that the present invention in particular makes it possible to resolve the problem of treating fields bordered by streams with phytosanitary product quite simply.

The regulations in fact require particular nozzles for spraying phytosanitary product near streams.

In the context of the present invention, it is possible to provide that the multi-nozzle units located near the ends of the spray bar 5 include such particular nozzles meeting the standards in force, and that those nozzles become operative automatically, under the control of the box 23, when the agricultural machine travels near streams.

The invention claimed is:

1. A spraying apparatus for an agricultural spraying machine, comprising a bar equipped with a plurality of multi-nozzle units wherein each multi-nozzle unit includes a plurality of nozzles grouped together such that the plurality of nozzles are each distributed on the same horizontal plane wherein a longitudinal axis of each nozzle is aligned perpendicular to the bar and each nozzle includes a valve located upstream of each nozzle, wherein each nozzle is configured to be operated individually and through a selected combination of the plurality of nozzles, wherein each nozzle is configured with a spraying characteristic that is different from that of the remaining nozzles in the multi-nozzle unit, and the spraying apparatus further includes means for piloting each multi-nozzle unit according to data representing the cartography of the plants to be treated.

2. The spraying apparatus according to claim 1, further comprising cartography means for the plants to be treated, control units for said multi-nozzle units, and a programmable electronic box, capable of receiving and processing information provided by said cartography means, and consequently sending control signals to each multi-nozzle unit.

3. The spraying apparatus according to claim 2, wherein said cartography means comprise geographical positioning means.

4. The spraying apparatus according to claim 3, wherein the geographical positioning means comprise means of the GPS type.

5. The spraying apparatus according to claim 2, wherein said cartography means comprise means for detecting the presence or absence of plants to be treated and/or their morphology.

6. The spraying apparatus according to claim 5, wherein said detection means comprise at least one of traditional cameras and infrared cameras.

7. The spraying apparatus according to claim 2, wherein said cartographic means comprise means suitable for measuring the slope of the bar of said agricultural machine.

8. The spraying apparatus according to claim 7, wherein said slope measuring means comprise means for detecting the distance of the bar from the ground or its vegetation and/or means for measuring the pressure difference of the phytosanitary liquid in ducts situated at two opposite ends of said bar.

9. The spraying apparatus according to claim 2, wherein the electronic box and said control units are connected to each other by a system comprising wired connections of the Bus or CAN bus type and/or wireless connections.

\* \* \* \* \*